United States Patent
Hudson et al.

(10) Patent No.: US 9,114,730 B1
(45) Date of Patent: Aug. 25, 2015

(54) SEAT MOUNTING STRUCTURE IN VEHICLE FLOOR FRAME

(71) Applicant: International Truck Intellectual Property Company, LLC, Lisle, IL (US)

(72) Inventors: Bryan Hudson, Beggs, OK (US); Raymond William Baggett, Naperville, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 30 days.

(21) Appl. No.: 14/184,291

(22) Filed: Feb. 19, 2014

(51) Int. Cl.
*B62D 25/20* (2006.01)
*B62D 31/02* (2006.01)
*B60N 2/015* (2006.01)

(52) U.S. Cl.
CPC ............... *B60N 2/015* (2013.01); *B62D 25/20* (2013.01); *B62D 31/02* (2013.01)

(58) Field of Classification Search
CPC ...... B60N 2/01583; B60N 2/01; B60N 2/012; B62D 25/20; B62D 25/2009; B62D 25/2018; B62D 25/2027; B62D 25/2036; B62D 25/2054; B62D 31/02; B62D 31/025
USPC ............. 296/178, 184.1, 64, 204, 193.07, 29, 296/30, 187.08
See application file for complete search history.

(56) References Cited

U.S. PATENT DOCUMENTS

| | | | | |
|---|---|---|---|---|
| 2,494,081 A * | 1/1950 | Baghuis | ......................... | 296/178 |
| 2,502,320 A * | 3/1950 | Guernsey | ....................... | 296/178 |
| 2,517,272 A * | 8/1950 | Baghuis | ......................... | 280/787 |
| 4,114,947 A | 9/1978 | Nelson | | |
| 4,254,987 A * | 3/1981 | Leonardis | ..................... | 296/178 |
| 5,464,273 A | 11/1995 | Makoto | | |
| 5,489,172 A | 2/1996 | Michler | | |
| 6,092,862 A * | 7/2000 | Kuwahara | ................... | 296/184.1 |
| 6,092,865 A * | 7/2000 | Jaekel et al. | ................... | 296/205 |
| 6,145,910 A * | 11/2000 | Baldas et al. | ............... | 296/65.01 |
| 6,189,852 B1 | 2/2001 | Hopley | | |
| 6,273,497 B1 * | 8/2001 | Devallez et al. | .......... | 296/203.01 |
| 6,322,105 B1 * | 11/2001 | Na | ................. | 280/781 |
| 6,375,249 B1 * | 4/2002 | Stanton et al. | ................ | 296/178 |
| 6,695,389 B2 * | 2/2004 | Streiff et al. | ................... | 296/178 |
| 6,824,204 B2 * | 11/2004 | Gabbianelli et al. | .......... | 296/205 |
| 6,932,405 B2 * | 8/2005 | Nakagawa et al. | ............. | 296/29 |
| 7,036,870 B2 | 5/2006 | Nieminski | | |
| 7,434,871 B2 * | 10/2008 | Mizuma et al. | .......... | 296/193.07 |

(Continued)

FOREIGN PATENT DOCUMENTS

| | | |
|---|---|---|
| WO | 2005/037597 A1 | 4/2005 |
| WO | 2009/095927 | 12/2009 |
| WO | 2009/095928 | 12/2009 |

*Primary Examiner* — Gregory Blankenship

(74) *Attorney, Agent, or Firm* — Jeffrey P. Calfa; Mark C. Bach

(57) ABSTRACT

A seat mounting structure for mounting a vehicle seat to a floor frame of a vehicle includes two side sills, and a cross-member extending between the two side sills. The cross-member has a receiving structure on an upper surface of the cross-member. A reinforcement rail is attached to the cross-member generally perpendicularly to the cross-member, and the reinforcement rail is configured to be received in the receiving structure of the cross-member. A floor skin is disposed over a top surface of the reinforcement rail. The reinforcement rail is configured to receive fasteners that fasten the vehicle seat to the reinforcement rail.

13 Claims, 4 Drawing Sheets

(56) References Cited

U.S. PATENT DOCUMENTS

| | | | |
|---|---|---|---|
| 7,523,978 B1* | 4/2009 | Timmermans et al. | 296/178 |
| 7,644,978 B2* | 1/2010 | Tosaka et al. | 296/187.12 |
| 7,716,835 B2* | 5/2010 | Johnson et al. | 29/897.2 |
| 7,854,472 B2* | 12/2010 | Gomi | 296/193.07 |
| 8,052,205 B2* | 11/2011 | Matsuyama | 296/193.07 |
| 8,066,321 B2* | 11/2011 | Lusk et al. | 296/178 |
| 8,100,462 B2* | 1/2012 | Minami et al. | 296/187.08 |
| 8,167,360 B2* | 5/2012 | Deng et al. | 296/187.08 |
| 8,814,255 B2* | 8/2014 | Yamaji et al. | 296/193.07 |
| 8,979,173 B2* | 3/2015 | Kojo et al. | 296/187.08 |
| 2005/0161975 A1 | 7/2005 | Nieminski | |
| 2007/0216197 A1 | 9/2007 | Wuerfel | |
| 2009/0184562 A1 | 7/2009 | Wilson et al. | |
| 2009/0189433 A1 | 7/2009 | Wilson et al. | |
| 2010/0308620 A1 | 12/2010 | Oriet et al. | |

\* cited by examiner

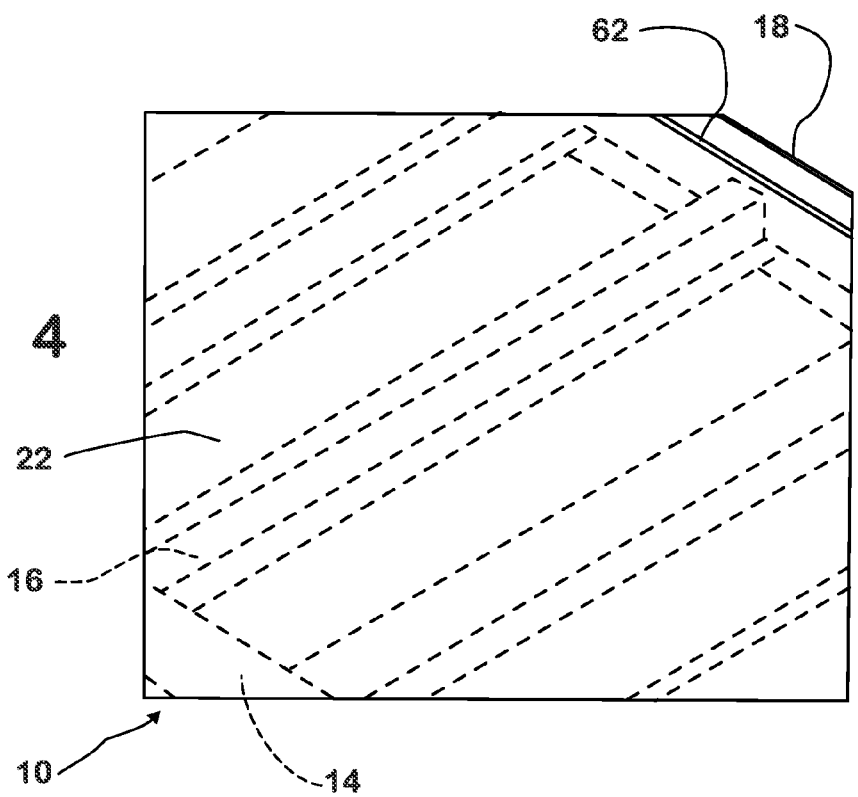
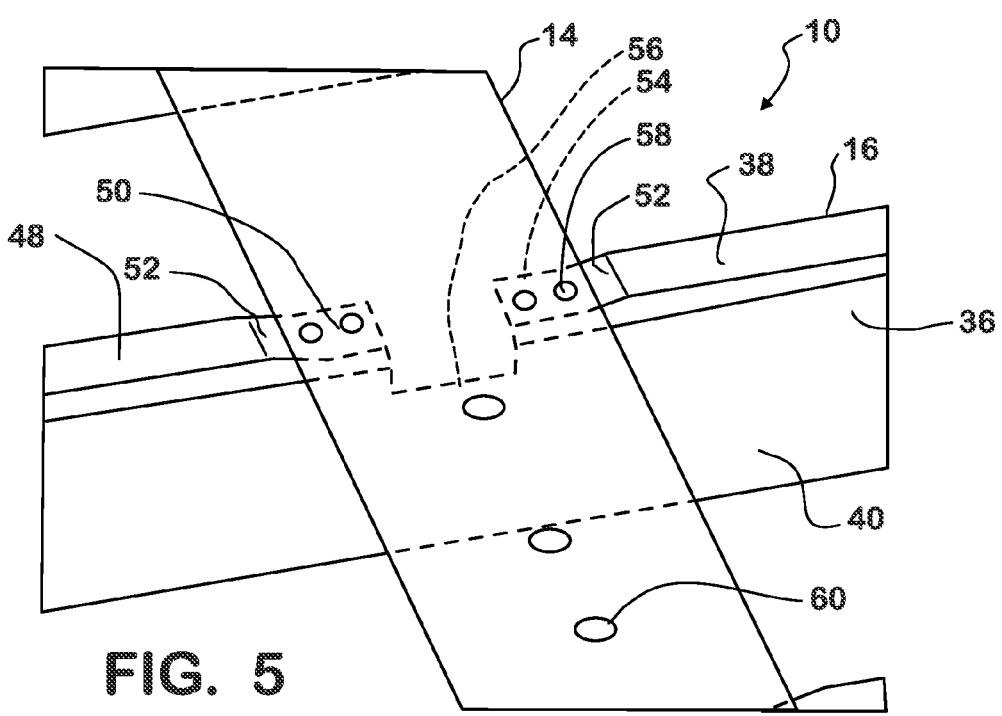

SEAT MOUNTING STRUCTURE IN VEHICLE FLOOR FRAME

BACKGROUND

Embodiments described herein relate generally to a mounting structure for a vehicle seat, and more particularly, to a mounting structure in a floor frame of a vehicle for mounting a vehicle seat to the vehicle.

In buses and other vehicles, the location, spacing, and type of vehicle seat may be custom ordered. Upon receipt of the order by the manufacturer, the vehicle seats are located on the bus by a body plan and mounted to the floor frame of the bus. The mounting points for the vehicle seats are located by a template and drilled from the top of the floor down through the floor and into the underbody structure of the vehicle. Since the locations of the vehicle seats can vary by the custom order, and since the underbody structure of the vehicle generally does not vary, the vehicle seat spacing ordered by the customer may not align with structural locations of the underbody structure. When the seat location dictated by the customer is not aligned with a structural location, the manufacturer may have to select and install additional reinforcements from the underside of the vehicle.

SUMMARY

A seat mounting structure for mounting a vehicle seat to a floor frame of a vehicle includes two side sills, and a cross-member extending between the two side sills. The cross-member has a receiving structure on an upper surface of the cross-member. A reinforcement rail is attached to the cross-member generally perpendicularly to the cross-member, and the reinforcement rail is configured to be received in the receiving structure of the cross-member. A floor skin is disposed over a top surface of the reinforcement rail. The reinforcement rail is configured to receive fasteners that fasten the vehicle seat to the reinforcement rail.

A seat mounting structure for mounting a vehicle seat to a floor frame of a vehicle includes two longitudinal side sills, and a plurality of cross-members extending between the two side sills. The cross-members each have at least one receiving structure on an upper surface of the cross-member, and each cross-member has at least one notch on an upper surface of the cross-member. A reinforcement rail is received in the receiving structure and is disposed generally perpendicularly to the cross-member. The reinforcement rail is configured to anchor the vehicle seat along the longitudinal length of the reinforcement rail.

A method of attaching a vehicle seat to a floor frame of a vehicle using a seat mounting structure includes the steps of providing cross-members that extend between two side sills of the floor frame, forming notches on a top surface of the cross-members according to the planned location of the vehicle seats, and attaching a longitudinal reinforcement rail perpendicularly to the cross-members on a top surface of the cross-members and over the notches. The method further includes the step of anchoring the vehicle seats to the reinforcement rails with fasteners.

BRIEF DESCRIPTION OF THE DRAWINGS

FIG. 4 is a perspective view of a floor skin attached to a top surface of the cross-members and over a top surface of the reinforcement rail, with the cross-members, the reinforcement rail and a lower portion of the side sill shown in phantom.

FIG. 5 is a perspective view of the reinforcement rail attached to the cross-member having a receiving structure and a notch.

DETAILED DESCRIPTION

Figure 1:
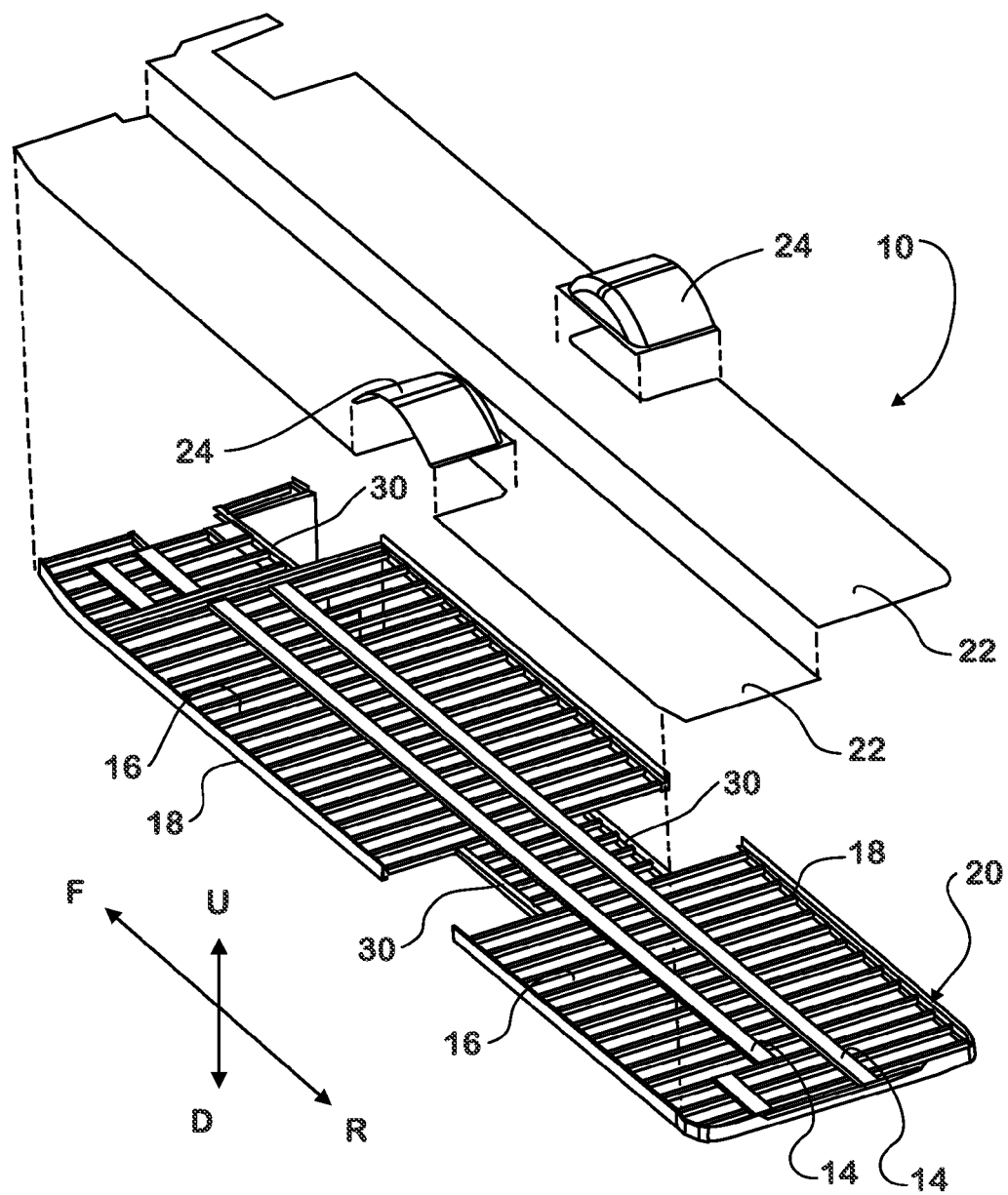
FIG. 1 is an exploded top perspective view of a seat mounting structure incorporated on a floor frame of a vehicle.

Referring to FIGS. 1-6, a seat mounting structure 10 for a vehicle 12 includes at least one reinforcement rail 14 that is attached to a plurality of cross-members 16. The cross-members 16 and longitudinal side sills 18 form a floor frame 20 of the vehicle 12, and the reinforcement rail 14 is attached to the floor frame to form the seat mounting structure 10. Floor skins 22 are attached over the top of the reinforcement rail 14 and the cross-members 16. Wheel pocket covers 24 that enclose the vehicle wheels (not shown) may also be attached to the floor frame 20. Vehicle seats 26 are located upwardly from the floor skins 22 in the passenger cabin 28 (see FIG. 6). While the vehicle 12 will be described below and be depicted in the drawings as a bus, it is possible that the seat mounting structure 10 can be implemented on other types of vehicles.

For purposes of this detailed description, the forward direction "F" is in the longitudinal direction of the floor frame 20 towards the driver's seat area of the vehicle, and the rearward direction "R" is the longitudinal direction towards the rear of the vehicle (as indicated by arrows in FIG. 1). The upward direction "U" is transverse to the longitudinal direction and towards the passenger cabin 28 of the vehicle, and the downward direction "D" is towards the driving surface.

The floor frame 20 includes two longitudinal side sills 18 that may extend substantially the length of the vehicle 12, or may be discontinuous. Referring to FIG. 1, the side sills 18 are discontinuous at locations of vehicle wheels (not shown), as well as at a location of the entry/exit stepwell of the vehicle 12. At these locations of discontinuity, there may be inset sills 30. The side sills 18 may be formed of different materials having different thicknesses, for example 16-gauge steel, however other materials and thicknesses are possible. The inset sills 30 may be 10-gauge steel, however other materials and thicknesses are possible. The side sills 18 may be generally "L"-shaped in cross-section with a lower leg 32 of the side sill facing the interior of the floor frame 20 and inwards towards the cross-members 16, and the main leg 34 being generally perpendicular to the lower leg (see FIG. 2).

Figure 2:
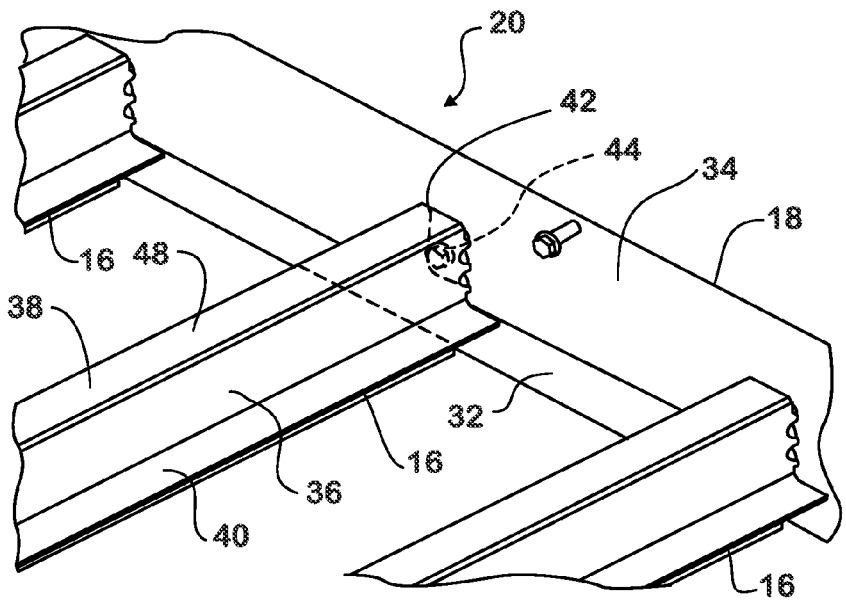
FIG. 2 is a perspective view of multiple cross-members attached to a side sill of the floor frame of the vehicle.

Extending laterally between the longitudinal side sills 18 are multiple cross-members 16. Referring to FIG. 2, each cross-member 16 may be generally "Z"-shaped in cross-section, having a web 36, an upper flange 38, and a lower flange 40. At each longitudinal end of the cross-member 16, a tab 42 may extend generally perpendicularly from the web 36. The cross-members 16 may be received in a perpendicular orientation with respect to the side sills 18 on an upper surface of the lower leg 32, such that the tab 42 of the cross-member 16 engages an interior surface of the main leg 34. The cross-members 16 are attached to the side sills 18, for example by a fastener 44 from the tab 42 to the main leg 34, and may also be spot welded to the side sills 18, however other methods of attachment are possible. Spanning between the side sills 18, the multiple cross-members 16 are spaced from each other along the length of the side sills 18. The cross-members 16 may be formed of different materials having different thicknesses, for example 10-gauge and 14-gauge steel, however other materials are possible.

Figure 3:
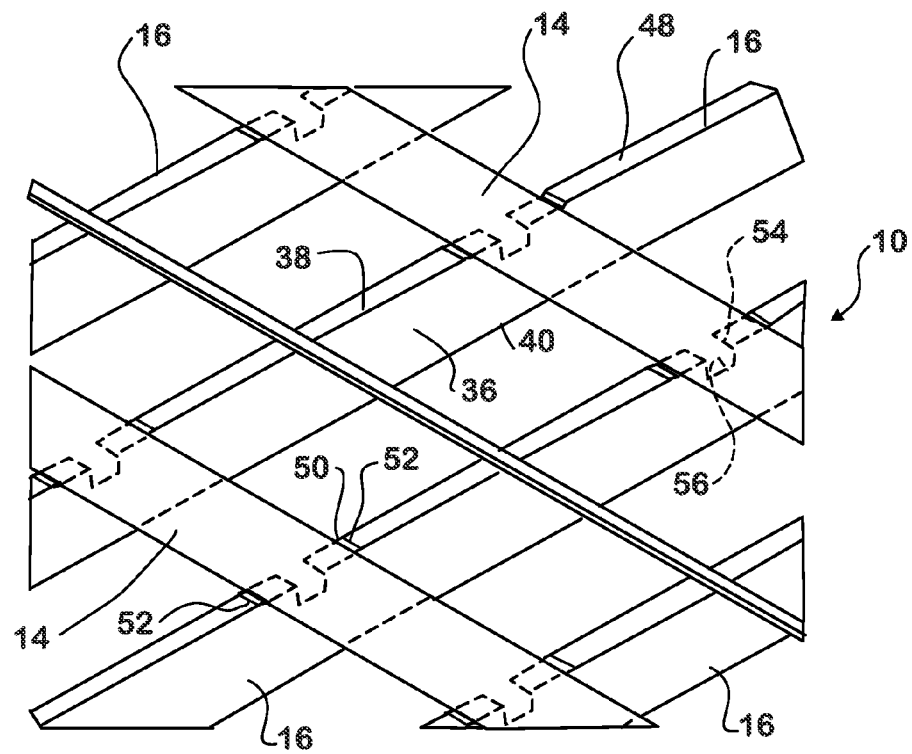
FIG. 3 is a perspective view of reinforcement rails attached to the cross-members of the seat mounting structure of the vehicle.

Referring to FIGS. 1, 3 and 5, reinforcement rails 14 are attached to an upper surface 48 of the cross-members 16, and may extend longitudinally substantially the longitudinal length of the vehicle 12. The upper flange 38 and the web 36 of the cross-members 16 are configured to receive the reinforcement rails 14 at a receiving structure 50 in the cross-member 16, such as a detent formed in the upper flange of the cross-member. The receiving structure 50 is sized, shaped and oriented to receive the reinforcement rail 14 at the receiving structure such that the reinforcement rail is generally perpendicular to the cross-members 16.

At the upper flange 38 of the cross-member 16, the receiving structure 50 may have a width generally larger and corresponding to the width of the reinforcement rail 14 such that detent retaining walls 52 defined by the upper flange maintain the reinforcement rail 14 on a platform 54 of the receiving structure. The platform 54 is generally parallel with the upper surface of the upper flange 38, and the retaining walls 52 are generally perpendicular or otherwise angled to the platform, however other configurations are possible. A notch 56 is formed in the upper flange 38 and may extend into a portion of the web 36. The notch 56 may be disposed generally centrally on the platform 54 and generally centrally on the receiving structure 50. When the reinforcement rail 14 is disposed in the receiving structure 50, the notch 56 may be generally centered beneath the reinforcement rail when the reinforcement rail is received in the receiving structure 50. Referring to FIG. 5, fasteners 58 may be used to attach the reinforcement rail 14 onto the upper flange 38 of the cross-member 16.

The reinforcement rail 14 is a generally elongate plate, and may be formed of different materials having different thicknesses, for example 12-gauge steel, however other materials are possible. The reinforcement rail 14 may be a coil-fed material. Along the longitudinal length of the reinforcement rail 14, there may be a plurality of fastener-receiving openings 60, which may be pre-formed or may be formed by during manufacturing of the seat mounting structure 10.

After the reinforcement rails 14 are attached to the cross-members 16, the floor skins 22 can be attached to the floor frame 20. Referring to FIGS. 1 and 4, the floor skins 22 may be two roll-formed or coil-fed members that are attached over the top of the cross-members 16 and the reinforcement rails 14. The floor skins 22 may have an upturned flange 62 at a side surface that engages the side sill 18 of the floor frame 20. The floor skins 22 may be welded to the side sill 18, however other methods of attachment are possible. The floor skins 22 may be formed of different materials having different thicknesses, for example 14-gauge and 18-gauge steel, however other materials are possible. The wheel pocket covers 24 may be spot welded and bonded to the floor skins 22.

Figure 6:
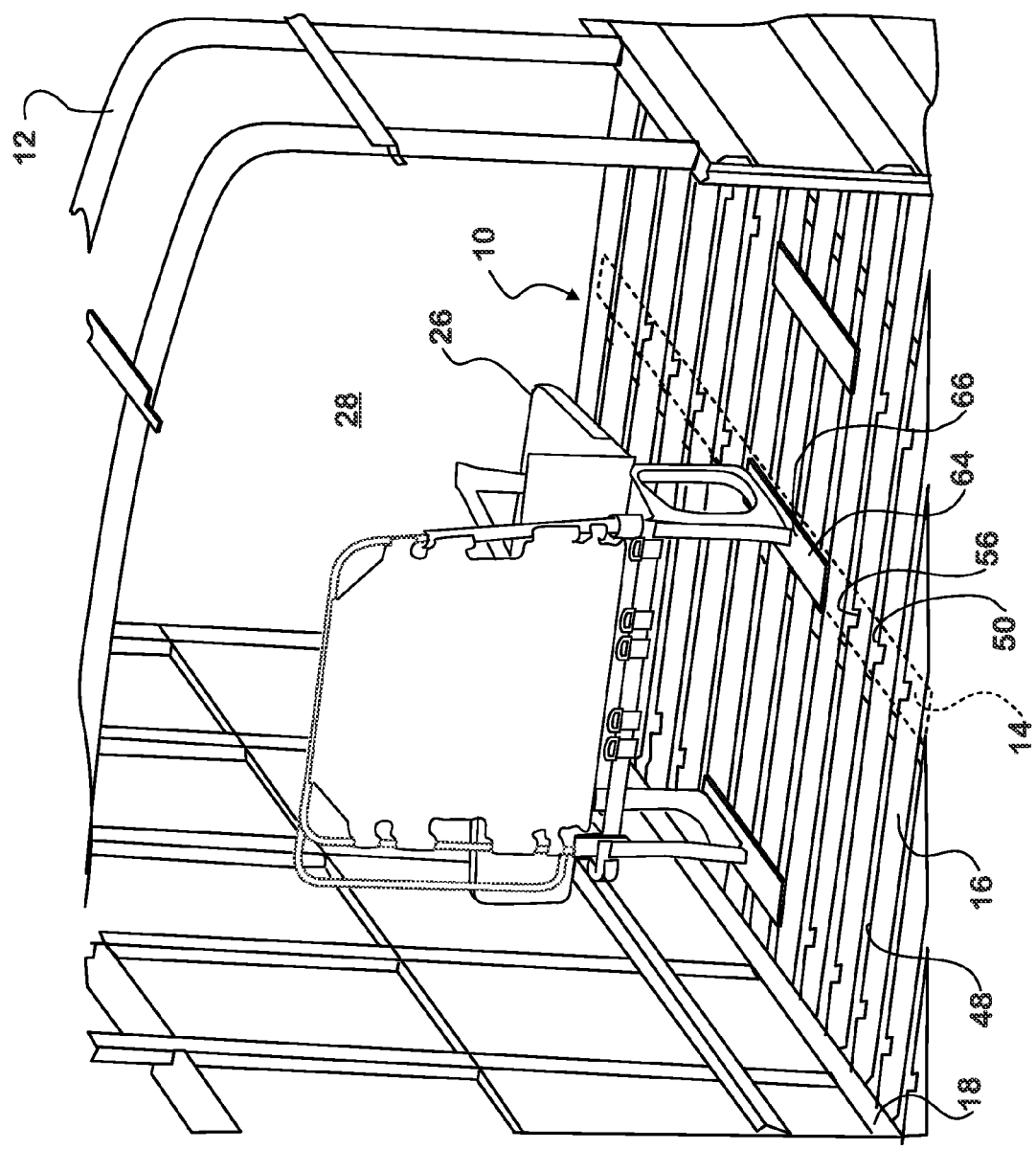
FIG. 6 is a perspective view of a vehicle seat mounted to the seat mounting structure, with the reinforcement rail shown in phantom attached to the cross-members, and with the floor skin removed for clarity.

Referring to FIG. 6, where the floor skins 22 have been removed for clarity and where the reinforcement rail 14 is shown in phantom, when the vehicle seat 26 is assembled onto the seat mounting structure 10, a base 64 of the vehicle seat is aligned in the vertical/upward direction with the reinforcement rail 14. The vehicle seat 26 is bolted or otherwise fastened to the reinforcement rail 14, which is in turn attached to the cross-member 16. The vehicle seat 26 may be fastened from the top of the base 64, through the floor skins 22, and into the reinforcement rail 14. As can be seen in FIG. 5, the notch 56 in the cross-members 16 allows the vehicle seat 26 to be fastened to the reinforcement rail 14 without the physical shape of the cross-member 16 interfering with the attachment to the reinforcement rail. If the notch 56 were not present in the cross-member 16, the upper flange 38 and the web 36 of the cross-member could potentially interfere with the bolted connection of the vehicle seat 26 to the reinforcement rail 14 depending on the spacing of the vehicle seat 26 along the floor frame 20.

Depending on the particular vehicle seat dimensions and spacing, the manufacturer can vary the location of the notches 56 and the receiving structure 50 on the cross-members 16 along the length of the cross-members (laterally across the floor frame 20) to accommodate vehicle seats 26 having different dimensions and spacing. With the seat mounting structure 10, multiple reinforcement rails 14 can be located at variable locations on the cross-members 16.

When the vehicle seats 26 are ordered by the customer and a body plan is completed, the seat mounting structure 10 can accommodate varying locations, spacing, and types of vehicle seats that may be ordered. With the seat mounting structure 10, the location of the notch 56 and the receiving structure 50 on the cross-member can be varied laterally along the floor frame 20 to accommodate the particular type of vehicle seat 26 to be attached. The manufacturer can locate the positions of the vehicle seats 26 on the body plan, configure the floor frame 20 to include the notches 56 and receiving structure 50 of the cross-members 16 and the reinforcement rail 14 at the location of attachment of the vehicle seats 26, and can drill and tap the fastener-receiving openings 60 through the reinforcement rails. The manufacturer may introduce a fastener 66 from the vehicle seat 26, through the floor skins 22 and into the reinforcement rail 14.

With the seat mounting structure 10, the seat mounting locations are aligned with the reinforcement rail 14. The reinforcement rail 14 is integrated into the floor frame 20, which obviates the manufacturer incorporating additional reinforcement members on an as-need basis to accommodate custom orders.

Installation of the vehicle seat 26 into the floor frame 20 is top-down. With the location of the notch 56 and the receiving structure 50 in the cross-members 16 varied to accommodate the particular vehicle seats 26, the cross-members themselves are no longer obstacles and the mounting locations of the vehicle seats 26 can be variable in the longitudinal direction of the vehicle 12. With the reinforcement rail 14, the floor frame structure is more consistent, and there is increased dimensional control of the location of vehicle seats 26.

What is claimed is:

1. A seat mounting structure for mounting a vehicle seat to a floor frame of a vehicle, the seat mounting structure comprising:
    two side sills;
    a cross-member extending between the two side sills, the cross-member having a receiving structure on an upper surface of the cross-member;
    a reinforcement rail attached to the cross-member generally perpendicularly to the cross-member, the reinforcement rail configured to be received in the receiving structure of the cross-member; and
    a floor skin disposed over a top surface of the reinforcement rail;
    wherein the reinforcement rail is configured to receive fasteners that fasten the vehicle seat to the reinforcement rail, wherein the cross-member comprises a web and a flange extending generally perpendicularly from the web, wherein the receiving structure is disposed in the flange.

2. The seat mounting structure of claim 1 wherein the receiving structure further comprises two retaining walls defined by the flange of the cross-member, and a platform disposed between the two retaining walls and defined by the flange of the cross-member.

3. The seat mounting structure of claim 1 wherein the cross-member further comprises a notch in the flange.

4. The seat mounting structure of claim 1 wherein the reinforcing rail is fastened to the cross-member with fasteners.

5. The seat mounting structure of claim 1 wherein the reinforcing rail further comprises fastener-receiving openings spaced longitudinally along the length of the reinforcement rail configured to receive the fasteners that fasten the vehicle seat to the reinforcing rail.

6. The seat mounting structure of claim 1 wherein the cross-member comprises a plurality of cross-members extending between the two side sills, and wherein the reinforcement rail comprises a plurality of reinforcement rails disposed generally perpendicularly to the plurality of cross-members and received in receiving structures of the cross-members.

7. A seat mounting structure for mounting a vehicle seat to a floor frame of a vehicle, the seat mounting structure comprising:
   two longitudinal side sills;
   a plurality of cross-members extending between the two side sills, the cross-members each having at least one receiving structure on an upper surface of the cross-member and each cross-member having at least one notch on an upper surface of the cross-member;
   a reinforcement rail received in the receiving structure and disposed generally perpendicularly to the cross-member, wherein the reinforcement rail is configured to anchor the vehicle seat along the longitudinal length of the reinforcement rail; and
   a floor skin disposed over a top surface of the reinforcement rail.

8. The seat mounting structure of claim 7 wherein the cross-member comprises a web and a flange extending generally perpendicularly from the web, wherein the receiving structure is disposed in the flange, and wherein the notch is disposed in the flange and in a portion of the web.

9. The seat mounting structure of claim 7 wherein the receiving structure further comprises two detent retaining walls defined by the flange of the cross-member, and a platform disposed between the retaining walls and defined by the flange, wherein the notch is disposed generally centrally on the seat.

10. The seat mounting structure of claim 7 wherein the reinforcing rails are fastened to the cross-members with fasteners.

11. A method of attaching a vehicle seat to a floor frame of a vehicle using a seat mounting structure, the method comprising:
    providing cross-members that extend between two side sills of the floor frame;
    forming notches on a top surface of the cross-members according to the planned location of the vehicle seats;
    attaching a longitudinal reinforcement rail perpendicularly to the cross-members on a top surface of the cross-members and over the notches; and
    anchoring the vehicle seats to the reinforcement rails with fasteners.

12. The method of attaching a vehicle seat of claim 11 further comprising the step of forming receiving structures on a top surface of the cross-members, wherein the notches are generally centered on the receiving structures.

13. The method of attaching a vehicle seat of claim 11 further comprising attaching multiple longitudinal reinforcement rails to the cross-members.

\* \* \* \* \*